United States Patent [19]

Caldwell

[11] Patent Number: 5,047,099
[45] Date of Patent: * Sep. 10, 1991

[54] MULCH MATERIAL AND METHOD OF MAKING THE SAME

[75] Inventor: Edward N. Caldwell, Knoxville, Tenn.

[73] Assignee: Dalen Products, Inc., Knoxville, Tenn.

[*] Notice: The portion of the term of this patent subsequent to Mar. 20, 2007 has been disclaimed.

[21] Appl. No.: 400,463

[22] Filed: Aug. 29, 1989

Related U.S. Application Data

[62] Division of Ser. No. 231,723, Aug. 12, 1988, Pat. No. 4,910,052.

[51] Int. Cl.5 .............................................. B31B 1/60
[52] U.S. Cl. ...................................... 156/60; 428/15; 428/17; 428/131
[58] Field of Search ...................... 156/60; 428/15, 17, 428/131

[56] References Cited

U.S. PATENT DOCUMENTS

| | | | |
|---|---|---|---|
| 2,515,847 | 7/1950 | Winkler | 154/49 |
| 3,252,251 | 5/1966 | Simmons | 47/29 |
| 3,555,728 | 1/1971 | Herns | 428/136 |
| 3,805,446 | 4/1974 | Aoyagi | 47/9 |
| 3,870,583 | 3/1975 | Gidge | 156/500 |
| 3,888,041 | 6/1975 | Seith et al. | 47/9 |
| 4,283,445 | 8/1981 | Bartholl | 428/17 |
| 4,405,665 | 9/1983 | Beaussier et al. | 428/17 |
| 4,910,052 | 3/1990 | Caldwell | 428/15 |

FOREIGN PATENT DOCUMENTS 197805 5/1978 France.
781262 11/1980 U.S.S.R..

*Primary Examiner*—Patrick J. Ryan
*Attorney, Agent, or Firm*—Candor, Candor & Tassone

[57] ABSTRACT

A sheet of mulch material and method of making the same are provided, the sheet of mulch material comprising a sheet of polymeric material having openings passing therethrough and opposed sides one of which is to face the ground on which the sheet of mulch material is to be disposed, and a sheet of fabric material being coextensive with and being secured to the one side of the sheet of polymeric material and overlapping the openings thereof to tend to prevent plant growth through the openings.

4 Claims, 1 Drawing Sheet

MULCH MATERIAL AND METHOD OF MAKING THE SAME

CROSS REFERENCE TO RELATED APPLICATION

This application is a divisional patent application of its copending parent patent application, Ser. No. 231,723, filed Aug. 12, 1988, now U.S. Pat. No. 4,910,052.

BACKGROUND OF THE INVENTION

1. Field of the Invention

This invention relates to a new sheet of mulch material and to a new method of making such a sheet of mulch material.

2. Prior Art Statement

It is known to provide a sheet of mulch material comprising a sheet or film of polymeric material that has a plurality of openings passing therethrough with such sheet of material being adapted to be disposed on the ground.

It is also known to provide a sheet of mulch material comprising a sheet of fabric material that is adapted to be disposed on the ground.

It is also known to provide a sheet of mulch material comprising a plurality of ribbons of the same type of material and disposed in overlapping relation at adjacent edges thereof, such overlapping ribbons being secured together by needle punching or the like and thereby providing coplanar openings through the sheet at the non-secured portions of the overlapping sections thereof.

SUMMARY OF THE INVENTION

It is one feature of this invention to provide a new sheet of mulch material wherein the same not only tends to prevent the growth of plants from the ground being covered thereby as well as tends to prevent the penetration of roots of plants forming above the mulch material from effectively growing into the ground being covered by the sheet of material, but also tends to control the amount of moisture penetration through the sheet of mulch material to the ground being covered by the sheet of mulch material as well as tends to retain that moisture and other moisture in the ground that is covered by the sheet of mulch material.

In particular, it was found according to the teachings of this invention that a sheet of polymeric material having openings passing therethrough can have a sheet of fabric material coextensive therewith and secured to the side thereof that is to be disposed on the ground so as to overlap the openings thereof to prevent plant growth through such openings in either direction thereof.

Further, it was found according to the teachings of this invention that the openings through the sheet of polymeric material can provide a relatively small percentage of open to closed area thereof and thereby control the amount of moisture penetration through the sheet of mulch material toward the ground as well as control the amount of evaporation of the moisture from the ground that is covered by the sheet of mulch material of this invention.

For example, one embodiment of this invention provides a sheet of mulch material that comprises a sheet of polymeric material having openings passing therethrough and having opposed sides one of which is to face the ground on which the sheet of mulch material is to be disposed, and a sheet of fabric material being coextensive with and being secured to the one side of the sheet of polymeric material and overlapping the openings thereof to tend to prevent plant growth through the openings.

Accordingly, it is an object of this invention to provide a new sheet of mulch material having one or more of the novel features of this invention as set forth above or hereinafter shown or described.

Another object of this invention is to provide a new method of making such a sheet of mulch material, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
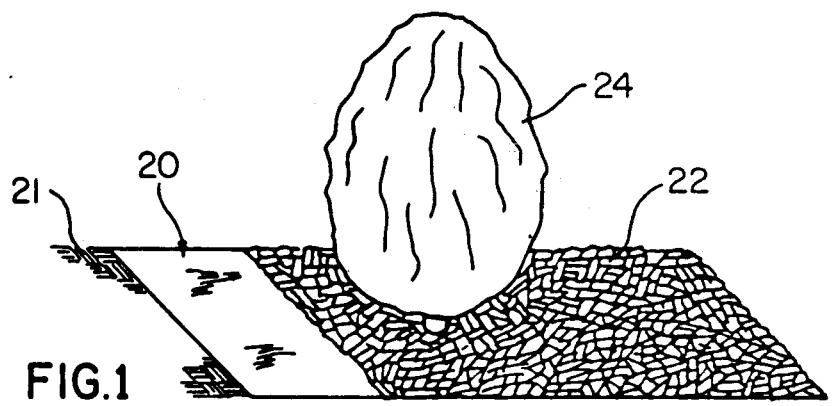
FIG. 1 is a schematic perspective view illustrating the sheet of mulch material of this invention disposed on the ground and having a dressing layer disposed on top of the same and one plant growing through an opening formed through the sheet of mulch material.

While the various features of this invention are hereinafter illustrated and described as being particularly adapted to provide mulch material for decorative uses and the like, it is to be understood that the various features of this invention can be utilized singly or in various combinations thereof to provide a mulch material for other landscaping, gardening, etc. uses, as desired.

Therefore, this invention is not to be limited to only the embodiment illustrated in the drawings, because the drawings are merely utilized to illustrate one of the wide variety of uses of this invention.

Referring now to FIG. 1, the new sheet of mulch material of this invention is generally indicated by the reference numeral 20 and is illustrated as being disposed on the ground 21 and having a layer of any suitable decorative dressing material 22 disposed on top of the same, the dressing material 22 being bark, sawdust, etc. as is well known in the art.

Figures 2, 3:
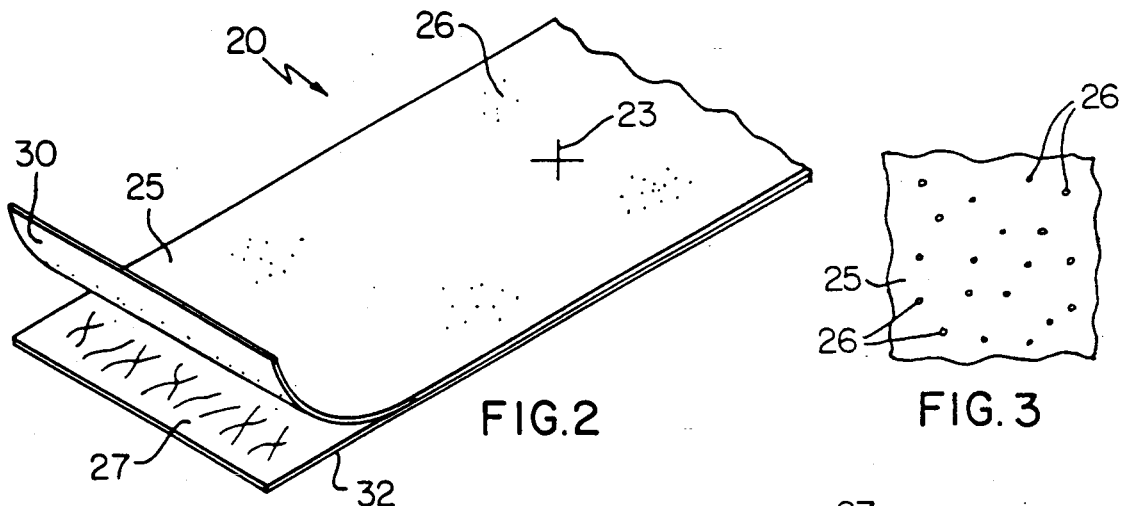
FIG. 2 is a fragmentary perspective view of the mulch material of this invention and illustrating the top sheet thereof pulled away at one end thereof to illustrate the two sheets or layers thereof.
FIG. 3 is an enlarged fragmentary view of one side of the top sheet of material of the sheet of mulch material of FIG. 2.

Also, as is well known in the art of utilizing sheets of mulch material, the sheet of mulch material 20 can be cut through in any suitable manner, such as by a knife, to provide an opening means 23 through which a plant 24 can be planted into the ground 21 for growing through the mulch material 20 and the decorative dressing 22 all in a manner well known in the art. As illustrated in FIG. 2, the cut 23 is shown as an X cut but the same could take any configuration as is well known in the art.

Figures 4, 5, 6:
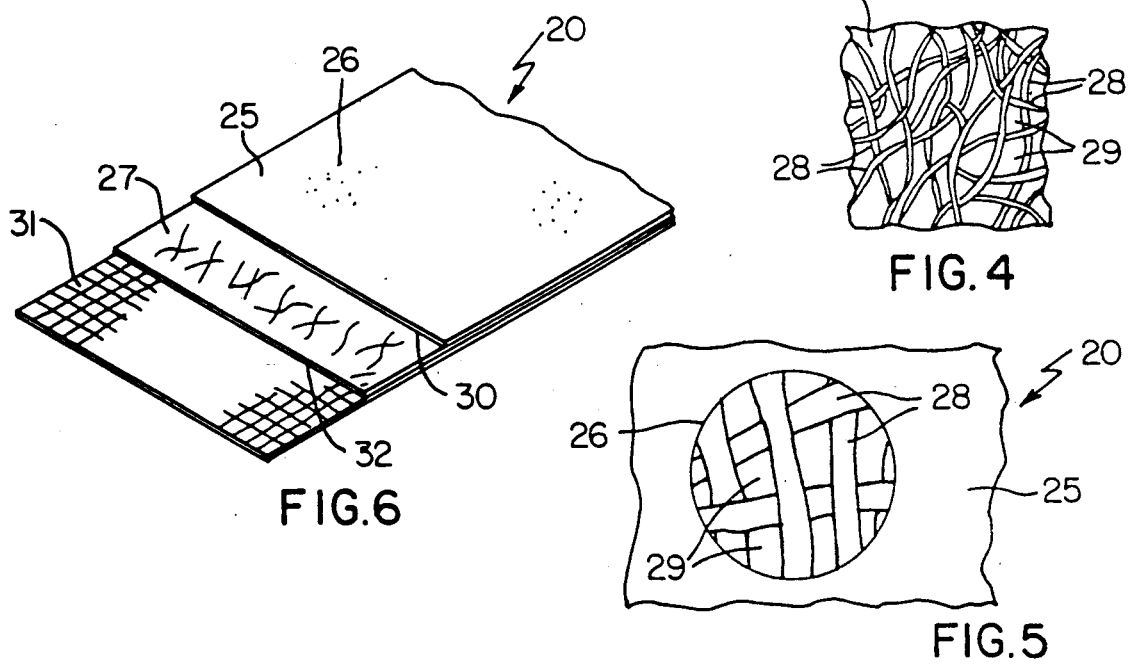
FIG. 4 is an enlarged fragmentary view of one side of the bottom sheet of material of the mulch material of FIG. 2.
FIG. 5 is an enlarged fragmentary view of a portion of the sheet of mulch material of FIG. 2 and illustrates how the fiber means of the lower sheet of material overlaps one of the small openings formed through the upper sheet of material thereof so as to tend to prevent plant growth in either direction therethrough.
FIG. 6 is a view similar to FIG. 2 and illustrates another embodiment of the mulch material of this invention.

The sheet of mulch material 20 of this invention comprises a top sheet or layer of polymeric material 25 having a plurality of small openings passing therethrough, one such opening being highly enlarged and being represented by the reference numeral 26 in FIG. 5. Such openings 26 can be uniform in size and uniformly formed through the surface area of the sheet of material 25 or could be randomly formed throughout the surface area thereof, as illustrated in FIG. 3, and have random sizes and shapes as will be apparent hereinafter. However, it is believed according to the teachings of this invention that such openings 26 should not have a diameter larger than approximately 0.50 of a millimeter and should provide an open to closed percentage of each square yard of the sheet of mulch material 20 between approximately 1 percent open and 99 percent closed to approximately 10 percent open and 90 percent closed.

While the sheet of polymeric material 25 can comprise any suitable material, in one working embodiment thereof the same comprises a film of polyolefin having a weight of approximately 0.35 ounces per square yard thereof and a thickness of approximately 0.0005 of an inch.

The sheet of mulch material 20 of this invention further comprises a lower or bottom sheet of fabric material 27 that comprises a plurality of fiber means 28, FIG. 5, bonded together while providing many small spaces 29 between the bonded fiber means 28 thereof, the fabric material 27 comprising any suitable polymeric fiber means 28, such as polyester fiber means 28, spun bonded together or adhesively bonded together in a well known manner to provide a nonwoven fabric sheet or layer 27. For example, in the one working embodiment of this invention mentioned above, such adhesively bonded fabric material 27 has a weight of approximately 1 ounce per square yard thereof and has a thickness of approximately 0.005 of an inch, the spacings 29 between adjacent fiber means 28 thereof being no larger than approximately 0.045 of a millimeter in length.

In the one working embodiment of the mulch material 20 of this invention, the sheet of polymeric material 25 originally does not have any openings 26 formed therethrough and the same is heat bonded to the fabric sheet 27 so that the fabric sheet 27 not only is coextensive with the facing side 30 of the sheet 25 but also is laminated thereto throughout substantially the entire surface area of the side 30 thereof, such heat bonding operation causing the openings 26 to be formed through the sheet 25 during the heating and/or subsequent cooling of the heat bonded sandwich whereby it is found that at least four to five fiber means 28 of the fabric layer 27 completely overlaps each of the largest openings 26 that are subsequently formed through the top layer 25 in the manner illustrated in FIG. 5.

Of course, it is to be understood that the openings 26 through the top sheet 25 could be preformed therein in any suitable manner rather than be formed during a heat bonding operation if desired. In fact, the sheet of polymeric material 25 could comprise a foamed sheet of any suitable polymeric material, such as a polyurethane material, wherein certain cells thereof will be closed and certain other cells thereof will be open to provide the openings through the foamed sheet of material to be covered by the fabric layer 27 in the manner previously set forth.

In addition, it may be found that it is desired to add a welded or woven fabric sheet 31 to the bottom side 32 of the fabric layer 27 in the manner illustrated in FIG. 6 to provide additional strength to the sheet of mulch material 20 of this invention. However, it is to be understood, that in the one working embodiment of the mulch material of this invention that has been previously set forth, such additional strength providing sheet 31 is not utilized as the sheet of fabric material 27 provides sufficient strength for the same.

It is believed that when the sheet of mulch material 20 of this invention is formed in the above manner and is utilized on the ground 21 in the manner illustrated in FIG. 1, not only are the openings 26 thereof of such a size that the same completely control the amount of liquid, such as rain, that is adapted to pass through the sheet 20 into the ground 21 but also such openings 26 control the amount of moisture that is adapted to evaporate from the ground 21 through the mulch sheet 20 of this invention. Also, the spacings 29 between the adjacent fiber means 28 of the fabric sheet 27 that overlap the openings 26 in the manner illustrated in FIG. 5 are such that the same will tend to prevent any plant growth from the ground 21 below the sheet 20 from passing through the openings 26 thereof so as to tend to prevent weed growth and the like. It has also been found that when the decorative dressing 22 is being utilized on top of the sheet 20 of this invention in the manner illustrated in FIG. 1, any random attempt of plants to grow in the decorative material 22 cannot have the root hairs thereof effectively pass through the openings 26 in the top layer 25 to reach the ground 21 because of the minute spacings 29 formed between the fiber means 28 of the fabric layer 27 and that the polymeric material 25 so strengthens the fabric layer 27 across the openings 26 because of the close coupling between the fiber means 28 and the polymeric material 25 at the openings 26 so that the root hairs are effectively prevented from establishing themselves below the mulch material 20 even though they may, to some degree, pass through the mulch material 20 at the openings 26.

Thus, it can be seen that the new sheet of mulch material 20 of this invention can readily be used in landscaping, gardening, etc., for the purpose of reducing weed problems and retaining ground moisture while allowing water and air to penetrate the ground in a controlled manner. For example, the openings 26 in the top layer 25 can be so sized specifically for the type of soil it is to be used with so that the openings 26 will allow no more water through the sheet of mulch material 20 than the particular soil can handle (i.e., high penetrability with sandy soils and low penetrability with clay soils), thus maximizing its effectiveness. However, it has been found that as long as the largest pores or openings 26 have diameters that are no greater than approximately 0.50 of a millimeter in length, the same can be effectively utilized with most types of soil. Also, it is found in the one working embodiment of this invention that has been previously set forth, the spacings 29 between adjacent fiber means 28 of the fabric layer 27 are no larger than approximately 0.045 of a millimeter in length and such spacing tends to choke off any root hairs that tend to penetrate through such spacings 29 at the openings 26 from random plants that might tend to grow in the dressing 22.

However, while one of the purposes of the fabric layer 27 is to serve as a barrier to penetration of plant growth in either direction, it is to be understood that the fabric layer 27 also spreads and wicks water throughout the layer 27 so as to effectively permit proper penetration of moisture into the ground 21 and also adds strength to the sheet of mulch material 20.

Therefore, it can be seen that this invention not only provides a new sheet of mulch material, but also this invention provides a new method of making a sheet of mulch material.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a sheet of mulch material comprising the steps of providing a sheet of polymeric material having openings passing therethrough and opposed sides one of which is to face the ground on which said sheet of mulch material is to be disposed, and providing a sheet of fabric material to be coextensive with and be secured to said one side of said sheet of polymeric material, the improvement comprising the steps of forming each said opening of said sheet of polymeric material to have a diameter no larger than approximately 0.05 of a millimeter in length and said sheet of fabric material to have a plurality of fiber means bonded together and defining spaces between adjacent fiber means so that each said space is no larger than approximately 0.045 of a millimeter in length whereby at least four fiber means completely overlap each of the largest said openings of said sheet of polymeric material to tend to prevent plant growth through said openings, said step of providing said sheet of fabric material comprising the steps of forming said sheet of fabric material of polymeric material, and heat bonding said sheet of fabric material to said one side of said sheet of polymeric material.

2. A method of making a sheet of mulch material as set forth in claim 1 and including the step of forming said sheet of fabric material to comprise spun bonded material having said plurality of fiber means bonded to each other.

3. A method of making a sheet of mulch material as set forth in claim 1 and including the step of forming said openings of said sheet of polymeric material to create an open to closed percentage of each square yard of said sheet of mulch material between approximately 1% open and 99% closed to approximately 10% open and 90% closed.

4. A method of making a sheet of mulch material as set forth in claim 1 and including the step of forming said sheet of polymeric material to comprise a layer of polymeric foam material that has open cells and closed cells with said open cells comprising said openings.

* * * * *

UNITED STATES PATENT AND TRADEMARK OFFICE
CERTIFICATE OF CORRECTION

PATENT NO. : 5,047,099
DATED : September 10, 1991
INVENTOR(S) : Edward N. Caldwell It is certified that error appears in the above—identified patent and that said Letters Patent is hereby corrected as shown below:

Column 6, line 5, cancel "0.05" and insert --0.50--.

Signed and Sealed this

Nineteenth Day of January, 1993

Attest:

DOUGLAS B. COMER

Attesting Officer

Acting Commissioner of Patents and Trademarks

UNITED STATES PATENT AND TRADEMARK OFFICE
CERTIFICATE OF CORRECTION

| | |
|---|---|
| PATENT NO. | : 5,047,099 |
| APPLICATION NO. | : 07/400463 |
| DATED | : September 10, 1991 |
| INVENTOR(S) | : Edward N. Caldwell |

It is certified that error appears in the above-identified patent and that said Letters Patent is hereby corrected as shown below:

Delete the below notice on the front of the patent:

[*] Notice: The portion of the term of this patent subsequent to Mar. 20, 2007 has been disclaimed.

And replace it with the following:

[*] This patent is subject to a terminal disclaimer.

Signed and Sealed this

First Day of August, 2006

JON W. DUDAS
*Director of the United States Patent and Trademark Office*